UNITED STATES PATENT OFFICE.

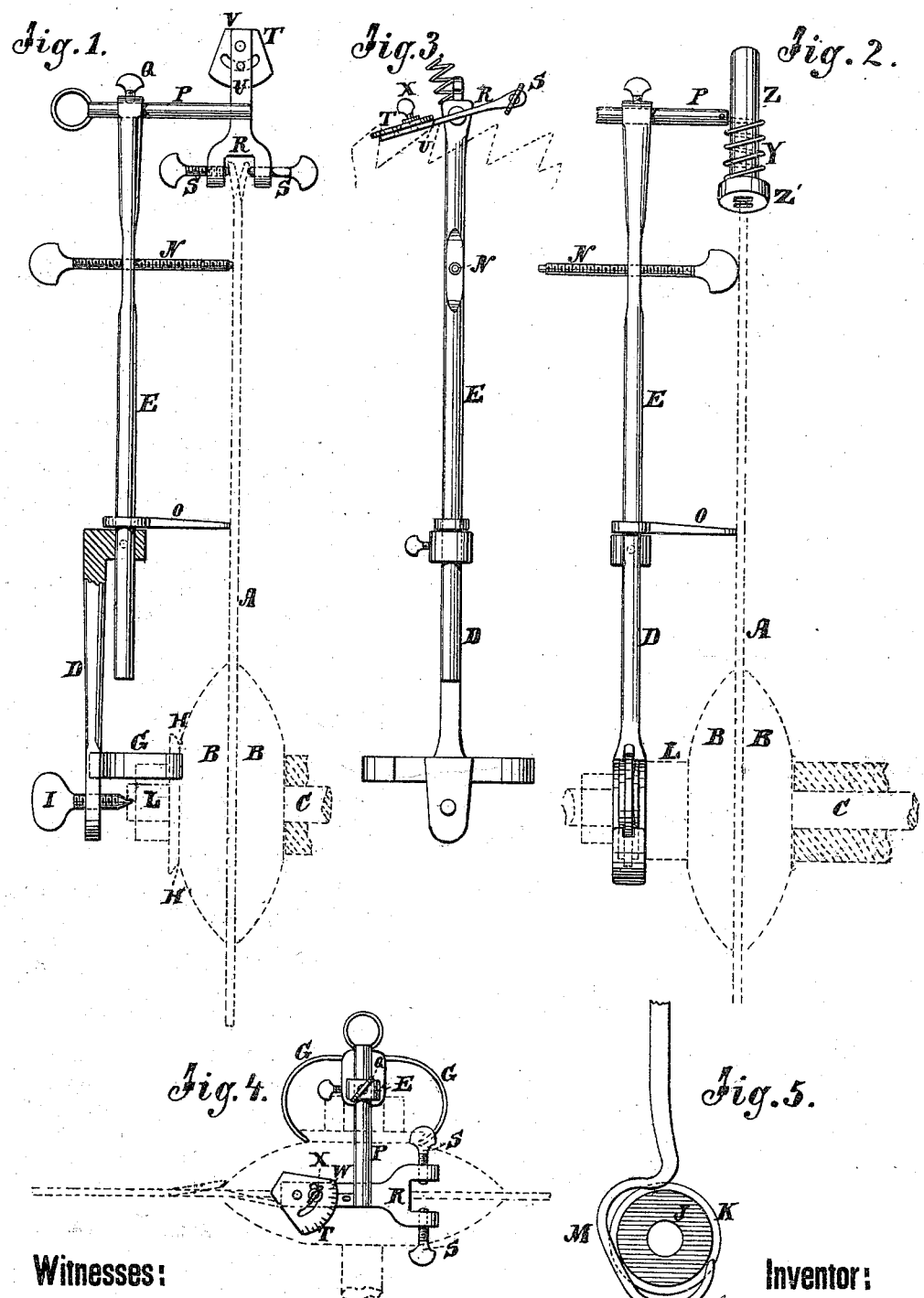

CYRUS E. GRANDY, OF STAFFORD SPRINGS, CONNECTICUT.

IMPROVEMENT IN SAW-TOOTH GAGES.

Specification forming part of Letters Patent No. 142,390, dated September 2, 1873; application filed June 7, 1873.

*To all whom it may concern:*

Be it known that I, CYRUS E. GRANDY, of Stafford Springs, in the county of Tolland and State of Connecticut, have invented a new and Improved Saw-Tooth Gage and Swage-Holder, of which the following is a specification:

My invention relates to apparatus for temporary attachment to the saw-mandrel of a circular saw, to gage the teeth round and as to the set; and consists, first, of improved means for attaching the sweep to the mandrel; second, a templet, in combination with the sweep, to insure the parallelism of the sweep with the saw; and an arrangement of the tooth-gage supporting-arm in the end of the sweep to shift laterally, as required, to adjust the gages to the plane of the saw; third, an arrangement of the gage-holding arm to oscillate in the sweep, to adjust the gage to the front face of the teeth; fourth, an adjustable gage, with a scale so arranged on the aforesaid arm that the angle of the teeth-front may be gaged by it with certainty—it is also arranged so as to gage the teeth round; fifth, an adjustable gage on the aforesaid arm for gaging the set of the teeth; and, sixth, an upsetting-swage holder on the said arm, all as hereinafter described.

Figure 1 is a side elevation of the improved tooth-gage and swage-holder, together with the saw-arbor and collars, in dotted lines, showing the set-gage adjusted to the saw. Fig. 2 is a view similar to Fig. 1, showing a modification of the means for attaching the sweep to the saw; also showing the upsetting-swage adjusted to the saw. Fig. 3 is a side elevation of Fig. 1, taken in a plane at right angles to the plane of said figure, and showing the gage for the front angle of the teeth adjusted to the saw. Fig. 4 is a plan view of the apparatus as adjusted in Fig. 3, together with the said collars and arbor, which are shown dotted; and Fig. 5 is a side elevation of a portion of Fig. 2, showing the mode of attaching the sweep to the mandrel.

A represents the saw, B the collars, and C the saw-arbor. D and E represent the sweep, to be attached to the mandrel. It is in this, as in other cases, made of two parts, so connected that it can be adjusted lengthwise for saws of different diameters. To attach the sweep to the saw-arbor, I propose to apply the two curved horizontal spring-jaws G to the end, so as to engage the groove H on the opposite sides horizontally, and fit a center screw, I, in it, so as to fit into the center cavity in the mandrel at the same time, and clamp the jaws against the sides of the groove. Or I will, in case I prefer it, use a washer, J, with a flange, K, projecting beyond the base of the collar B and the nuts L, between which it is clamped, and fit the part M of the sweep around it, with notches to bear on the washer at three points when sprung onto it. As the groove and center, or the washer J, will vary more or less in the different saws in the distance from the saws, so that a permanent arm or pin, N, would fail in most cases to hold the sweep exactly parallel with the saw, which is very important as affecting the angle of the teeth, I propose to make the said arm or pin adjustable in the sweep, so that it can be changed as needed by any saw, and provide with each gage a templet, O, which being once adjusted by filing off the end to show exactly when the sweep is parallel with the saw, may be used to test the adjusting-pin and set it by, so that in case it be shifted after being set it can be readily corrected.

The importance of this will be seen at once, when it is considered that the arm P, at the outer end of the sweep, must be exactly parallel with the said arbor, in order that the gages for the teeth, which are supported on it and adjusted at right angles to it, shall be right for gaging the teeth relatively to the plane of the saw.

In consequence of this adjustment of the sweep for saws in which the distances from the grooves on the flange from the saw, and also to allow of revolving the arm P to use different gages on opposite sides, it is arranged in the end of the sweep, so as to be adjustable endwise and revolved, and is fastened by a set-screw, Q. The gage for regulating the width of the set of the teeth consists of the notched plate R, with the opposite adjustable gage-screws S, against which the outer corners of the teeth are gaged, and which can be shifted readily for gaging teeth set more or less wide. The gage for gaging the length of the teeth and to round the saw, also for squaring the points of the swaged or upset teeth, consists of the plate T; and this is also the gage for the bevel or angle of the front of the teeth, when they are filed bevel to the plane of the saw, which is generally the case with teeth that are set by beveling them. This plate is pivoted to the arm U, on which it is supported, so that the edge can be adjusted square or otherwise to the point of the tooth, as required, and a scale, W, is provided on the upper circular end, by which to be guided in adjusting it to the angle required and in shifting it to the reversed teeth; and a thumb-screw, X, is provided, for holding it when it is adjusted. The swage or upsetting-tool holder consists, in this example, of a coiled wire, Y, attached to the arm P at the end opposite to the one holding the gage, and arranged to hold the stem Z above the collar Z' of the swage, in the manner shown; but any other suitable holder may be employed. The wire is used mainly on account of its capacity to yield by the rebound of the tool without much shock to the sweep, and to impinge upon the stem so as to hold it without other fastening. The part E of the sweep is turned around in the part D when the swage-holder is to be used.

This kind of swage-holder, it will at once be seen, will insure the dressing of the teeth much truer to the required angle than can be done by holding the tool by the hand, and it materially lessens the labor.

The advantages appertaining to the use of the gage T, also the gage R, in respect of the greater accuracy attained in the teeth, are manifest, and do not need to be enlarged upon.

Having thus described my invention, I claim as new and desire to secure by Letters Patent—

1. The spring-arms G and center screw I, combined with the sweep D E, the grooved collar, and the center socket in the saw-arbor, substantially as specified.

2. The combination, in a saw-tooth gage, of the templet O, adjusting-pin N, and adjusting-gage arm P, substantially as specified.

3. The combination of the saw-gage arm arranged in the sweep to revolve, the set-gage R on one side, and the angle and rounding gage T on the other side, substantially as specified.

4. The combination, with the sweep and gage-arm, of the angle and rounding gage plate T, arranged to shift so as to gage different and opposite angles, and provided with the scale W, substantially as specified.

5. A swage or upsetting-tool holder, Y, combined with the gage-arm, substantially as specified.

CYRUS E. GRANDY.

Witnesses:
   S. H. SEWARD,
   E. N. MILTON.